US011429111B2

(12) United States Patent
Medeiros et al.

(10) Patent No.: US 11,429,111 B2
(45) Date of Patent: Aug. 30, 2022

(54) ROBOTIC TRACKING NAVIGATION WITH DATA FUSION

(71) Applicant: Marquette University, Milwaukee, WI (US)

(72) Inventors: Henry Ponti Medeiros, Fox Point, WI (US); Andres Echeverri Guevara, Davie, FL (US); Juan Tapiero Bernal, Wauwatosa, WI (US); James O'Rourke, Pewaukee, WI (US)

(73) Assignee: Marquette University, Milwaukee, WI (US)

( * ) Notice: Subject to any disclaimer, the term of this patent is extended or adjusted under 35 U.S.C. 154(b) by 303 days.

(21) Appl. No.: 16/484,389

(22) PCT Filed: Feb. 6, 2018

(86) PCT No.: PCT/US2018/017038
§ 371 (c)(1),
(2) Date: Aug. 7, 2019

(87) PCT Pub. No.: WO2018/148195
PCT Pub. Date: Aug. 16, 2018

(65) Prior Publication Data
US 2019/0361460 A1 Nov. 28, 2019

Related U.S. Application Data

(60) Provisional application No. 62/456,345, filed on Feb. 8, 2017.

(51) Int. Cl.
*G05D 1/00* (2006.01)
*G05D 1/02* (2020.01)
*G06T 7/277* (2017.01)

(52) U.S. Cl.
CPC ......... *G05D 1/0246* (2013.01); *G05D 1/0257* (2013.01); *G06T 7/277* (2017.01); *G06T 2207/10028* (2013.01)

(58) Field of Classification Search
CPC .... G05D 1/0246; G05D 1/0257; G06T 7/277; G06T 2207/10028
(Continued)

(56) References Cited

U.S. PATENT DOCUMENTS

2009/0231183 A1* 9/2009 Nettleton .............. G01S 13/726
342/95
2012/0316680 A1* 12/2012 Olivier, III ........... G05D 1/0246
700/258

(Continued)

OTHER PUBLICATIONS

David Held, Sebastian Thrun, and Silvio Savarese, Learning to Track at 100 FPS with Deep Regression Networks, Sep. 2016, Stanford University, Entire Document. (Year: 2016).*

*Primary Examiner* — Tyler J Lee
*Assistant Examiner* — Tiffany P Ohman
(74) *Attorney, Agent, or Firm* — Andrus Intellectual Property Law, LLP

(57) ABSTRACT

Disclosed are systems and methods of sensor fusion for exemplary use with robotic navigation control. Systems and methods include providing local estimates of a target location from a plurality of expert modules that process sensor data. The local estimates are weighted based upon a Mahalanobis distance from an expected estimated value and based upon a Euclidean distance between the local estimates. The local estimates are fused in a Bayesian fusion center based upon the weight given to each of the local estimates.

14 Claims, 5 Drawing Sheets

(58) Field of Classification Search
USPC .......................................................... 701/23
See application file for complete search history.

(56) References Cited

U.S. PATENT DOCUMENTS

| | | | |
|---|---|---|---|
| 2015/0304634 A1* | 10/2015 | Karvounis | G06T 7/277 348/46 |
| 2015/0310281 A1* | 10/2015 | Zhu | G06K 9/00805 382/104 |
| 2016/0096272 A1* | 4/2016 | Smith | B25J 9/0081 700/253 |

* cited by examiner

ROBOTIC TRACKING NAVIGATION WITH DATA FUSION

CROSS-REFERENCE TO RELATED APPLICATION

This application is the U.S. national stage application of International Application PCT/US2018/017038, filed Feb. 6, 2018, which international application was published on Jun. 28, 2018, as International Publication WO2018/115907 in the English language. The international application is incorporated herein by reference, in entirety. The international application claims priority to U.S. Provisional Patent Application No. 62/456,345, filed on Feb. 8, 2017, the content of which is hereby incorporated herein by reference in its entirety.

BACKGROUND

The present disclosure relates to the field of robotic navigation. More particularly, the present disclosure relates to the use of data fusion in a tracking system of robotic navigation.

Various navigable robots are known. This includes unmanned aerial vehicles (UAVs) which are commonly known as drones. Other forms of navigable robots include mobile ground based robot platforms. One type of autonomous or semi-autonomous navigation includes tracking or following an object, which may include a person, animal, or object. This tracking may use some form of computer vision as an input. There has been a significantly growing interest in robotic platforms for object or pedestrian tracking. The design of such platforms usually involves several main elements: trackers that are flexible enough to detect and follow different types of targets in different scenarios; a robust depth estimation mechanism; a robust mechanism for the detection and removal of false-positives or outliers; and, well tuned motion controls.

Many current approaches seek to improve the results of computer vision tracking by the addition of more and more expensive sensors to provide additional input. Yet with this additional input, the various information sources, for processing and calculating purposes are treated independently. Some examples of robotic navigation systems are for example provided in the following references: (See: U.S. Pat. Nos. 9,070,289, 9,171,261, U.S. 2007/0018890, WO 2016/131847, U.S. Pat. Nos. 7,211,980, 7,765,062, U.S. 2016/0031559, "Sensor Fusion of Camera, GPS, and IMU Using Fuzzy Adaptive Multiple Motion Models," Bostanci et al., and "A Fault-Tolerant Multiple Sensor Fusion Approach Applied to VAV Attitude Estimation," Gu et al.) the contents of which are incorporated herein by reference in their entireties.

In recent years, advancements in visual tracking have allowed the emergence of new robotic platforms capable of following objects with good results. However, robustness is still a major concern in the computer vision community. This is in part due to problems that make it difficult to associate images of a target in consecutive video frames within an unknown scenario. These problems include: motion of the object and/or camera, orientation and pose change, illumination variation, occlusion, scale change, clutter, and the presence of similar objects in the scene. These common disturbances make tracking with any single approach unreliable in many short term scenarios and nearly impossible in most long term applications. While a specific algorithm could work for certain scenarios, it might not work for others. Based on this paradigm, this paper proposes a general tracking approach by fusing several of these algorithms into a unique output. The fusion is done at the bounding box level, where measurements provided by each of the individual tracking algorithms is processed as a sensor measurement.

In the literature, sensor fusion is also known as multisensor data fusion, data fusion, or combination of multisensor information. All of these methods aim for the same goal of creating a synergy of information from several sources. Normally, the observations performed by individual sensors suffer from inaccuracies. A system with only one sensor that observes a physical phenomenon generally cannot reduce its uncertainty without relying on extra sensors. Furthermore, a failure of the sensor leads to a failure of the system as a whole. Different types of sensors provide a spectrum of information with varying accuracy levels and the ability to operate under different conditions.

Despite the advances noted above, robustness in visual tracking is still a major concern for robotic navigation. This is in part due to problems that make it difficult to associate images of a target in consecutive video frames within an unknown scenario. These problems include: motion of the object and/or camera, orientation and pose change, illumination variation, occlusion, scale change, clutter, and the presence of similar objects in the scene. These common disturbances make tracking with any single approach unreliable in many short term scenarios and nearly impossible in most long term applications. While a specific algorithm could work for certain scenarios, it might not work for others.

In the computer vision and object following field, most algorithms have moved towards machine learning fusion techniques. However, these require a significant amount of training. Furthermore, the computational demands of those proposed techniques limit their utility in real-time control applications. A more generalized solution to the evaluation of multiple input sources can provide a solution adapted to real-time control applications.

BRIEF DISCLOSURE

An exemplary embodiment of a method of robotic navigation includes navigable robot. The navigable robot includes a plurality of sensors and a processor. Tracking data from each of the plurality of sensors is obtained. A local estimate of a target location is estimated separately from the tracking data of each of the plurality of sensors. A Mahalanobis distance is calculated between an estimated value and the local estimate for each of the local estimates. The Mahalanobis distance is a first weighting factor for each local estimate. A Euclidean distance between each of the local estimates is calculated. A second weighting factor is calculated for each local estimate based upon the calculated Euclidean distance. The local estimates are combined in an adaptive Bayesian fusion based from each of the local estimates weighted by the respective first weighting factor and the second weighting factor for each estimate to produce a target location.

An exemplary embodiment of a navigable robot includes at least one sensor configured to produce tracking data of a target object. The navigable robot includes a plurality of detector modules. Each detector module in the plurality include at least on processing algorithm to independently provide a local estimate of a location of the target object when applied to the tracking data. A controller is connected to the at least one sensor and a plurality of detector modules. The controller receives tracking data acquired by the at least one sensor and applies the algorithms from the plurality of detector modules to the tracking data to produce a plurality of separate estimates of the location of the target object in the tracking data. The controller weighs the separate estimates. The controller combines the local estimates in an adapted Bayesian fusion based on the weighted local estimates to produce a target location.

In further exemplary embodiments of the navigable robot, the at least one sensor includes a camera and the tracking data includes at least image data. The controller may calculate a Mahalanobis distance (MD) between an estimated value and a local estimate for each of the local estimates. The MD is a first weighting factor for each local estimate. The controller may calculate a Euclidean distance between each of the local estimates and calculate a second weighting factor for each local estimate based upon the calculated Euclidean distance. The controller may combine the local estimates in an adapted Bayesian fusion based upon each of the local estimates weighted by the respective first weighting factor and the second weighting factor for each estimate to produce the target location.

In further exemplary embodiments, the controller may use an auto-encoder trained with acquired data to learn a model of the detectors of the plurality of detectors under normal operation. The controller analyzes the local estimates from each detector module of the plurality of detector modules to determine an event of detector failure and decreases a weighting of angle estimate from a detector based upon the determined event.

An exemplary embodiment of a method of robotic navigation of a navigable robot includes obtaining tracking data from each of a plurality of sensors. A local estimate of a target location is separately estimated from the tracking data from each of the plurality of sensors. A Mahalanobis distance is calculated between an estimated value and the local estimate for each of the local estimates. The Mahalanobis distance is a first weighting factor for each local estimate. A Euclidean distance is calculated between each of the local estimates. A second weighting factor is calculated for each local estimate based upon the calculated Euclidean distance. The local estimates are combined in an adapted Bayesian fusion based upon each of the local estimates weighted by the respective weighting factor and the second weighting factor for each estimate to produce the target location.

DETAILED DISCLOSURE

Figure 1:
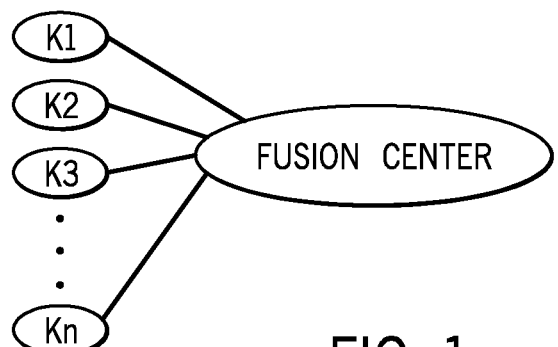
FIG. 1 is a diagram of an exemplary embodiment of a hierarchical adaptive Bayesian data fusion system.

Unless otherwise specified or indicated by context, the terms "a," "an," and "the," mean "one or more." For example, "a mechanism" should be interpreted to mean "one or more mechanisms."

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion of additional components other than the components recited in the claims. The term "consisting essentially of" should be interpreted to be partially closed and allowing the inclusion only of additional components that do not fundamentally alter the nature of the claimed subject matter.

In the literature, sensor fusion is also known as multisensor data fusion, data fusion, or combination of multisensor information. All of these methods aim for the same goal of creating a synergy of information from several sources. Normally, the observations performed by individual sensors suffer from inaccuracies. A system with only one sensor that observes a physical phenomenon generally cannot reduce its uncertainty without relying on extra sensors. Furthermore, a failure of the sensor leads to a failure of the system as a whole. Different types of sensors provide a spectrum of information with varying accuracy levels and the ability to operate under different conditions.

Disclosed herein is a general tracking approach by fusing several of these algorithms into a unique output. As one or more sensors or algorithms may unexpectedly become unreliable during tracking navigation, the fusion approaches described herein can accommodate this event. Specific examples of the sensors and/or algorithms used as inputs will be described in further detail herein. The fusion is exemplarily performed at the bounding box level, where measurements provided by each of the individual tracking algorithms is processed as a sensor measurement.

Disclosed herein is a general Bayesian approach for real-time applications in robotic navigation platforms. The robotic navigation platforms may include any of a variety of navigable robot platforms, including but not limited to UAV's, pan-tilt cameras, and mobile ground based robot platforms. The proposed systems and method process the bounding boxes of the trackers/detectors as sensor measurements. This framework is founded in the basis of the bank of Kalman Filters with some similarities with the mixture of experts aforecited. Furthermore, this scheme addresses some of the previously noted common problems such as data imperfection, outliers and spurious data, measurement delays, static vs. dynamic phenomena, and others.

In the description provided herein, all visual trackers/detectors used in this work that produce a bounding box, for example, but not limited to DSSTtld, CMT, Struck, TLD, PROST, GOTURN, or VTD will be called "detectors". More detailed descriptions of these and other detectors can be found in Reznichenko, Y; Medeiros, H. "Improving target tracking robustness with Bayesian data fusion," British Machine Vision Conference (BMVC), 2017, which is incorporated by reference herein in its entirety. These algorithms are processed as sensors that cast measurements. Thus, while system as described herein may include one or more sensors, those sensors may results in more detectors if sensor data is processed in multiple ways. Each different processing algorithm applied to sensor data to produce a different tracking data is herein considered a different detector. Thus, one sensor may result in one or more detectors. The systems and methods described herein, which may be generally referred to as Hierarchical Adaptive Bayesian Data Fusion (HAB-DF). While the primary examples as given herein use multiple camera/vision detectors, it will be recognized that in other embodiments a more diverse combination of sensors and/or detectors may be used and combined in the manners as disclosed herein. Non-limiting examples of other sensors and/or detectors may include range sensors, depth sensors, radars, GPS, beacons, or other navigational detectors as would be recognized by a person of ordinary skill in the art.

Exemplary embodiments of the systems and methods disclosed herein employ a Bayesian approach that adapts on line instead of a gating network of a traditional mixture of experts approach. This Bayesian approach requires no training for the system. Exemplary embodiments are organized in two levels or hierarchies: the experts and the fusion center. Each expert module, Ki, i=1, . . . n, works asynchronously from the other modules. Usually, a bank of estimators is applied when the sensors differ in model, as each suffers from different failure types. In an exemplary embodiment, the experts are Kalman Filters (KFs). FIG. 1 shows a representation of a hierarchical adaptive Bayesian data fusion approach. The first level of the hierarchy includes experts that provide a local estate to the fusion center. The fusion center is the second level of the hierarchy.

In the hierarchical model, each expert, exemplarily a K, is equipped with an outlier detection mechanism that calculates a reliability score. The fusion center merges the outputs of each expert by adopting a weighted majority voting scheme. The state vector of the KF is exemplarily given by x=[u v h w u̇ v̇ ḣ ẇ], where u, v are the pixel coordinates of the center of the target, h and w are its height and width, respectively. u̇ v̇ ḣ ẇ are the velocities in each dimension. Also, the matrix A was chosen to adopt the random acceleration model. Matrices A, B and C are defined below, $$A = \begin{bmatrix} I_4 & I_4 \\ 0_4 & I_4 \end{bmatrix},$$ Eq. 1

$$B = \begin{bmatrix} 0_{2\times 4} \\ k_1 \mid 0 \\ 0 \mid 0 \\ 0 \mid k_2 \end{bmatrix},$$

$$C = \begin{bmatrix} 1_{3\times 1} & 0_{3\times 3} & 0_{3\times 6} \\ 0_{3\times 1} & 1_{3\times 1} & 0_{3\times 8} \\ 0_{2\times 2} & 1_{2\times 1} & 0_{2\times 7} \\ 0_{2\times 3} & 1_{1\times 2} & 0_{2\times 6} \end{bmatrix}$$

where $I_m$ is square identity matrix, $0_{m\times n}$ is a matrix of zeros, and $1_{m\times n}$ is a matrix of ones, with m and n being the rows and columns respectively. Matrix A above assumes that the target moves with a constant velocity such that $\dot{x}(t)=\dot{x}(t-1)$, $\dot{y}(t)=\dot{y}(t-1)$ and $\dot{z}(t)=\dot{z}(t-1)\forall(t)$. The matrix B accounts for the effect of the control action of the PID controller on the velocities of the u and z axes, where $k_1$ and $k_2$ are constants defined upon the nature of the controlled variables. The rotation of the robot is accomplished by controlling the displacement in the image Δu. This relationship can be considered $\Delta\theta \approx \Delta u$ since the displacement from one frame to another is small in comparison to the distance between the robot and the target. Translation is carried out by attempting to preserve the relative distance between the robot and the target at the first instant of time. The C matrix indicates that the only measurements available at any given time are the current u, v coordinates of the object (the output of the detectors) and z, the range from the robot to the object. This information may be obtained from the relative scale of the target as reported by one or both of a detector and a dense depth sensor. The dense depth sensor may exemplarily be a time of flight (ToF) or stereo camera. The data fusion between these two sensors will be covered in detail below.

Based upon the above matrix, the object tracking system is then represented as:

$$x(t)=Ax(t-1)+Bu(t)+w(t)$$ Eq. 2

$$y(t)=Cx(t)+v(t)$$ Eq. 3 wherein Eq. 2 represents the system dynamics, including the state transition matrix A, the include of the control action B, and the process noise w. Equation 3 is the measurement model, which includes the observation matrix C and the measurement noise v. The process noise and measurement noise are assumed to be white and Gaussian, with variances $R_{ww}$ and $R_{vv}$ respectively. That is, w~ $\mathcal{N}(0,R(0,R_{ww})$ and v~ $\mathcal{N}(0,R_{vv})$.

The standard Bayesian Kalman filter is comprised of two major components and three intermediary calculations. The two major components are a prediction step and an update step. The update step refines, or corrects, the previous prediction. The three intermediary calculations (innovation, error covariance, and Kalman gain), are necessary for moving from the prediction step to the update step. Below are all the necessary equations for implementing the standard Bayesian Kalman filter:

Prediction:

$$\hat{x}(t|t-1)=A(t-1)\hat{x}(t-1|t-1)+B_u$$ Eq. 4

$$\hat{P}(t|t-1)=A(t-1)\hat{P}(t-1|t-1)A(t-1)^T+R_{ww}(t)$$ Eq. 5

Innovation:

$$e(t)=y(t)-C(t)\hat{x}(t|t-1)$$ Eq. 6

$$R_{ee}(t)=C(t)\hat{P}(t|t-1)C(t)^T+R_{vv}(t)$$ Eq. 7

$$K(t)=\hat{P}(t|t-1)C(t)^T R_{ee}(t)^{-1}$$ Eq. 8

$$\hat{x}(t|t)=\hat{x}(t|t-1)=K(t)e(t)$$ Eq. 9

$$\hat{P}(t|t)=(I-K(t)C(t))\hat{P}(t|t-1)$$ Eq. 10

The Kalman filter creates an estimate of the predicted mean and covariance of the system state, equations (4) and (5) respectively. For the object tracking system, this includes the u, v and z coordinates and h, w dimensions (or alternatively distance z) of the object and its velocity in each direction. Then, using the output of the object detector (only current u, v coordinates) as measurements and (9) and (10), an update of the system mean and covariance is made. This update is theoretically more accurate than the previous prediction as it makes use of additional information (the new measurements). In order to perform the update, the innovation e(t), error Covariance $R_{ee}(t)$, and Kalman gain K(t) must be calculated. This is accomplished through equations (6), (7), and (8), respectively.

This model is used for a UAV embodiment and also an exemplary pan-tilt system embodiment. However, the UAV does not take into consideration matrix B due to the high coupling amongst controllers. Moreover, the matrix C considers the fusion amongst detectors and is used in the fusion center. Two approaches are used in the present disclosure to reduce the sensor fusion uncertainty. A Mahalanobis distance is used to produce a local estimate concerned about the reliability of the measurement. Majority voting provides a global approach to sensor fusion uncertainty. The solution is divided into a two-level hierarchy: experts and the fusion center. While each expert uses position and speed for accuracy, the fusion center fuses direct measurements such as position, but still predicts speeds for better results in subsequent frames. Furthermore, the concept is not limited to KFs. In further embodiments, a Bayesian estimator, as recognized by a person of ordinary skill in the art in view of the present disclosure, can be used to accomplish fusion. Nevertheless, KFs are known for being efficient, fast, and ideal for real-time applications.

There are two main purposes for fusing sensor measurements in this system. The first is to increase overall estimation accuracy. The second is to allow the robot to follow a target even when it goes beyond the threshold of the dense depth sensor. The dense depth sensor is able to measure depth consistently and precisely when a target is in relatively close proximity, however, it becomes very noisy and unreliable at greater distances, generating many false measurements. In some exemplary embodiments, this close proximity may be less than 10 meters, less than 5 meters or less than 1 meter. A depth estimate based on relative scale changes as measured by the detectors is used to compensate for these false measurements, effectively extending the operating range of the system.

The depth measurement from the dense depth sensor is calculated by averaging all the non-zero depth pixels inside the target bounding box (pixels whose depth cannot be estimated, such as those beyond the camera range, are read with a zero value). The height and width (h and w) provided by the detectors are used to measure the scale variations of the target and hence provide an indirect depth estimate. The scale change of the target is translated to a real distance according to:

$$TLD_z = K_z \cdot \sqrt{\frac{w_{img} \times h_{img}}{w \times h}} \qquad \text{Eq. 11}$$

where Kz is a constant obtained by relating the initial depth measurement from the camera to the initial target bounding box size (w and h) and $h_{img}$ and $w_{img}$ are the height and width of the image. The reliability of the dense depth sensor depth measurement is determined according to the following sigmoidal relationship:

$$R_{vv\zeta} = 1 - \frac{1}{1 + e^{\eta \times r_0 - \zeta}} \qquad \text{Eq. 12}$$

where $r_0$ is the percentage of zero elements in the target bounding box image, h defines the slope of the function and $\zeta$ is the value where the penalization takes place. The sigmoid function allows the Kalman filter to smoothly transition between the dense depth sensor and the detector distance measurements using the following covariance matrix:

$$R_{vv} = \text{diag}(R_{vv_x}, R_{vv_y}, Rvv_{ToF}, Rvv_{TLD}) \qquad \text{Eq. 13}$$

where diag(.) represents a diagonal matrix, $Rvv_{ToF}$ and $Rvv_{TLD}$ are defined as follows:

$$Rvv_{ToF} = 100 \times Rvv_\zeta \qquad \text{Eq. 14}$$

$$Rvv_{TLD} = 100 \times (1 - Rvv_\zeta) \qquad \text{Eq. 15}$$

Kalman Filters, like other filters, are susceptible to abnormally large errors in estimation. This in part is due to KFs not being robust to outliers. In exemplary embodiments, the Mahalanobis distance (MD) is used to address this weakness by providing a measure of how much a predicted value differs from its expected distribution.

Figure 3:
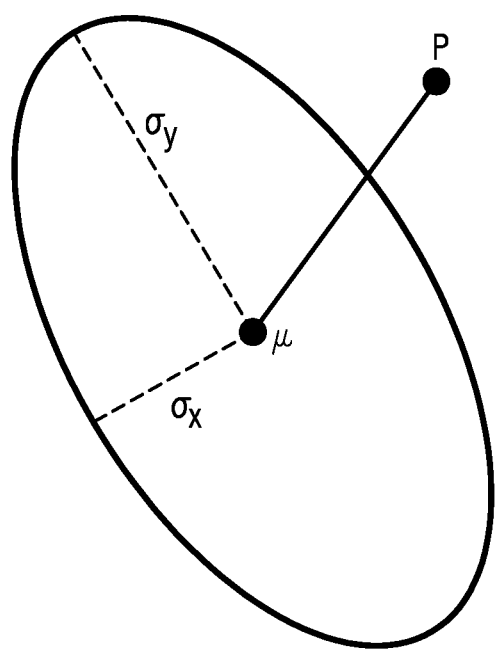
FIG. 3 is a diagram that represents a Mahalanobis distance.

The MD is pictorially represented in FIG. 3. Point P with coordinates (x, y) and a joint distribution of two variables defined by parameters μ, $\sigma_x$ and $\sigma_y$, are depicted. Point P depicts an outlying predicted value. The distance is zero if P=μ. The distance increases as P moves away from u. This method can also be used for more than two dimensions.

Outliers occur due to modeling uncertainties, incorrect process/measurement noise covariances selection, and other external disturbances. If the estimation error (the difference between the real state and the estimated state) of the KF is beyond a certain threshold, the MD can penalize the expert as being in failure or abnormal mode. Alternatively, one can use the predicted measurement to determine outliers. This error is then defined as follows: given a measurement $y = [y_1\ y_2 \ldots y_N]^T$, the MD from this measurement to a group of predicted values with mean $\mu = [\mu_1\ \mu_2 \ldots \mu_N]^T$ and covariance matrix is given by:

$$M(y) = \sqrt{(y-\mu)^T C^{-1}(y-\mu)} \qquad \text{Eq. 16}$$

Since each expert is equipped with its own MD calculation, an approximated version is used:

$$M(y) \approx \sum_{i=1}^{N} \left(\frac{q i^2}{C_i}\right)^{1/2} \qquad \text{Eq. 17}$$

where $q_i = y_i - \mu_i$ and $C_i$ is the $i^{th}$ value along the diagonal of the innovation covariance C. Eq. (17) decreases the computational burden if a considerable number of experts is needed. Usually, an estimator can be penalized if the MD is beyond certain threshold. However, doing so yields hard transitions. To soften this rule, a sigmoid function has been employed:

$$w_M = \frac{1}{1 + e^{(-\eta \times M(y) + c)}} \qquad \text{Eq. 18}$$

where c is a value chosen using the $X^2$ distribution based on the number of degrees of freedom (DOF) of the system and the desired confidence level. Outliers are identified using Eq. (18) where $w_M$ represents an expert's performance in the form of a local weighting function.

In exemplary embodiments, sensor fusion uncertainty may be further characterized globally within the system by majority voting. There are many ways to determine the weights in a majority voting scheme. In an exemplary embodiment, the majority voting is a weighted decision that combines the output of multiple detectors (e.g. information from multiple bounding boxes). This method begins by calculating the pairwise Euclidean distance between bounding boxes $$d_i(p,r) = \|p - r\|, i = 1, 2, 3, \ldots, n \qquad \text{Eq. 19}$$

where p and r are vectors that represent the coordinates and the size of the bounding boxes for two different detectors $D_i$ and $D_j$. A statistical descriptor such as the minimum value can be used to reach consensus among all the detectors $$\min_d = \min(d_1, \ldots, d_n), i = 1, 2, 3, \ldots, n \qquad \text{Eq. 20}$$

Figure 4:
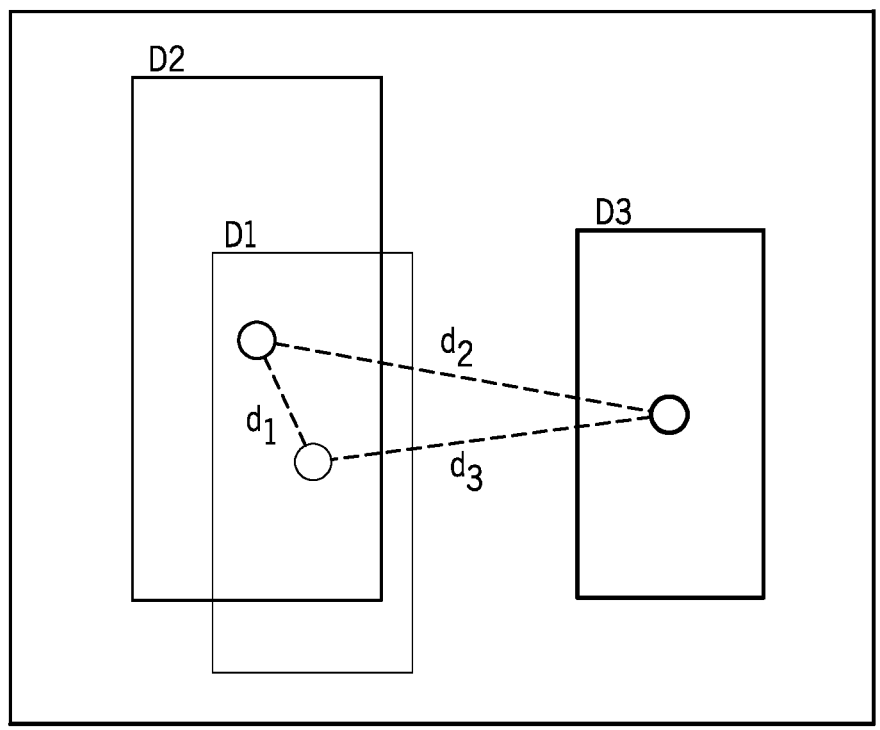
FIG. 4 is a diagram of an exemplary scenario with three detectors.

FIG. 4 diagrammatically depicts an exemplary scenario of object tracking with three bonding box detectors. FIG. 4 diagrammatically depicts bondingbox detectors D1, D2, D3. Distances $d_i$ are traced from the center of each detector. While these distances are shown as the center distances among detectors (u and v), they also comprise their heights and widths (h and w). In this scenario, $D_1$ and $D_2$ are close to each other, while $D_3$ is farther away. The consensus will penalize $D_3$ in this case, since $d_1$ is the minimum distance. In the scenario depicted on FIG. 4, detector D3 would be penalized because it is farther from the other two detectors. This scheme imposes no limit to the number of detectors/sensors that can be used. The only limitation is computational performance. A minimum of three detectors/sensors is needed in embodiments so that a consensus can be reached.

To calculate a weight that penalizes detectors for being farther from the cluster of detectors, instead of using a hard limiter, a hyperbolic tangent is applied, allowing a soft transition among detectors:

$$w_d = w_O + w(1 + \tan h(\eta \times \min_d - \lambda)) \qquad \text{Eq. 21}$$

where $w_O$ is an initial weight consistent with the observed phenomenon, w is the desired impact of the penalization function, which determines the overall effect of a particular detector in the fusion if it drifts away, λ determines the slope of the function, and 1 determines the distance at which the penalization starts taking place.

Referring back to FIG. 1, the system and method for example employs an adaptive fusion center as described herein. The bank of KFs is composed of one filter for each sensor/detector. Each filter/expert in the bank gives a local estimate of the detector/measurement assigned to that particular filter. Another KF acts as the fusion center, which adapts itself at each measurement by updating its measurement noise covariance according to:

$$R_{vv}(w_d, w_M) = \Gamma w_d + \Delta w_M \qquad \text{Eq. 22}$$

where $w_d$ and $w_M$ are given by Eqs. (21) and (22), respectively, $\Gamma = \text{diag}(\gamma_1, \gamma_2, \ldots, \gamma_n)$, $\Delta = \text{diag}(\delta_1, \delta_2, \ldots, \delta_n)$, and diag(.) represents a diagonal matrix whose elements are the function parameters. $\gamma_i$ and $\delta_i$ can be set to 1 if there is no a priori knowledge of the system. Otherwise, $\gamma_i$ can be set to a value depending on the knowledge of the noise of the sensor and di can be set to a value depending on how much drift the sensor suffers.

Figure 2:
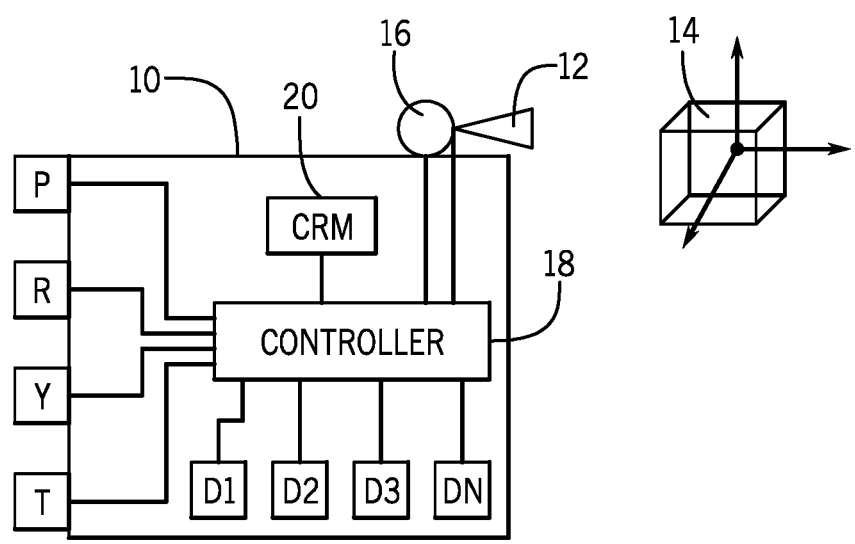
FIG. 2 is a system diagram of an exemplary embodiment of a system for robotic tracking navigation with data fusion.

FIG. 2 is a system diagram of an exemplary embodiment of a system for robotic tracking navigation with data fusion. The system 10 is exemplary embodied as a robot, for example a drone, which may be but is not limited to the AR Drone 2.0 from Parrot SA. While an exemplary embodiment of an unmanned aerial vehicle (UAV) drone is given in the present example, it will be recognized that other forms of unmanned vehicles or robots may be used to implement embodiments of the system as described herein while remaining in the scope of the present disclosure. The drone 10 exemplarily includes a camera 12 which operates to acquire image data of an object 14. The object 14 is exemplarily movable in three-dimensional space and its movement desired to be tracked and followed by the drone 10. In an exemplary embodiment, the camera 12 is the sensor that provides the data used to position the drone 10 and track the object 14. However, it will be recognized that in other embodiments, additional sensors, including, but not limited to range sensors, depth sensors, radars, GPS, beacon, or other navigational detectors as would be recognized by a person of ordinary skill in the art. It will be recognized that while only the sensor of the camera 12 is depicted in FIG. 2, that sensors associated with these other types of detection may be included in embodiments as disclosed herein.

The camera 12 may be a fixed camera or may be connected to a servo motor at 16 which may operate a gimbal to directionally move the camera 12. In embodiments, this may be used to orient the camera 12 at the object 14, such as to maintain the object 14 within the center of the field of view of the camera 12. In other embodiments, this may be used to compensate the camera position due to movement of the drone 10.

The camera 12 provides image data to a controller 18. The controller 18 may be a processor, microprocessor, or other microcontroller as would be recognized by a person of ordinary skill in the art. In one exemplary embodiment, and Intel core i7-3630Qn CPU and 2.40 GHz×8 processor and a Quadro K1000m graphics card were used. The controller 18 is communicatively connected to a computer readable medium 20 which may be an integral component with the controller 18 or may be communicatively connected thereto. The CRM 20 is programmed with computer readable code, for example a code implemented in C++ and executable by the controller 18. Upon execution of the computer readable code on the CRM 20 by the controller 18, the controller carries out the function as described in further detail herein, including the execution of the algorithms as described herein for the hierarchical Bayesian data fusion of multiple detector output.

The controller 18 applies a plurality of computer modules each representative of a detector as used in the present application, the detector modules including computer readable code that is exemplarily stored on a computer readable medium and, including, but not limited to the CRM 20. Execution of the detector modules by the controller 18 causes the controller 18 to process the image data from the camera 12 in accordance with that detector module. As noted above, exemplary embodiments combine at least two and preferably more than two detector outputs through the hierarchical Bayesian data fusion process described in the present application. In an exemplary embodiment, the detector module, exemplarily identified as D1, D2, D3, and Dn may at least represent the detectors of DSSTtld, CMT, and Struck bounding box detectors. Detector module Dn represents that additional detectors may further be used in other embodiments, including but not limited to GOTURN. The controller 18 produces the output results from each of the detectors and combines them according to the HAB-DF method as described herein.

The controller 18 uses the HAB-DF method to produce at least one control command. The control commands are directed to at least one operational motor that controls a navigation of the robot. The navigation may exemplarily be a movement of a camera, a movement of a ground vehicle, or a movement of an aerial vehicle. The control commands may exemplarily be sent to the servo motors 16 operable to control a position of the camera 12 in an embodiment wherein the drone 10 operates to maintain the object 14 in the center of view of the camera 12 through camera movement, while in another embodiment, the control commands two motors or other movement devices exemplarily to control drone pitch (p), roll (r), yaw (y), and throttle (t). These position control devices may be motor, propeller, impeller, air jets, or other position control devices as may be recognized by a person of ordinary skill in the art.

In an exemplary embodiment, the position control devices, including, but not limited to servo motors, may be driven by the controller 18 using a sub controller (not depicted) for example an Arduino UNO that converts the position commands into pulse wave modified (PWM) signals for the position control devices. These may further be implemented using PID or PD controllers. As noted above, in an exemplary embodiment, the drone 10 may be controlled to maintain a target distance from the object 14. In an exemplary embodiment, this may be done based upon image analysis of the image data obtained from the camera 12 to maintain a relative scale of the object 14 in the image data, relative to the field of the image data.

Figure 5:
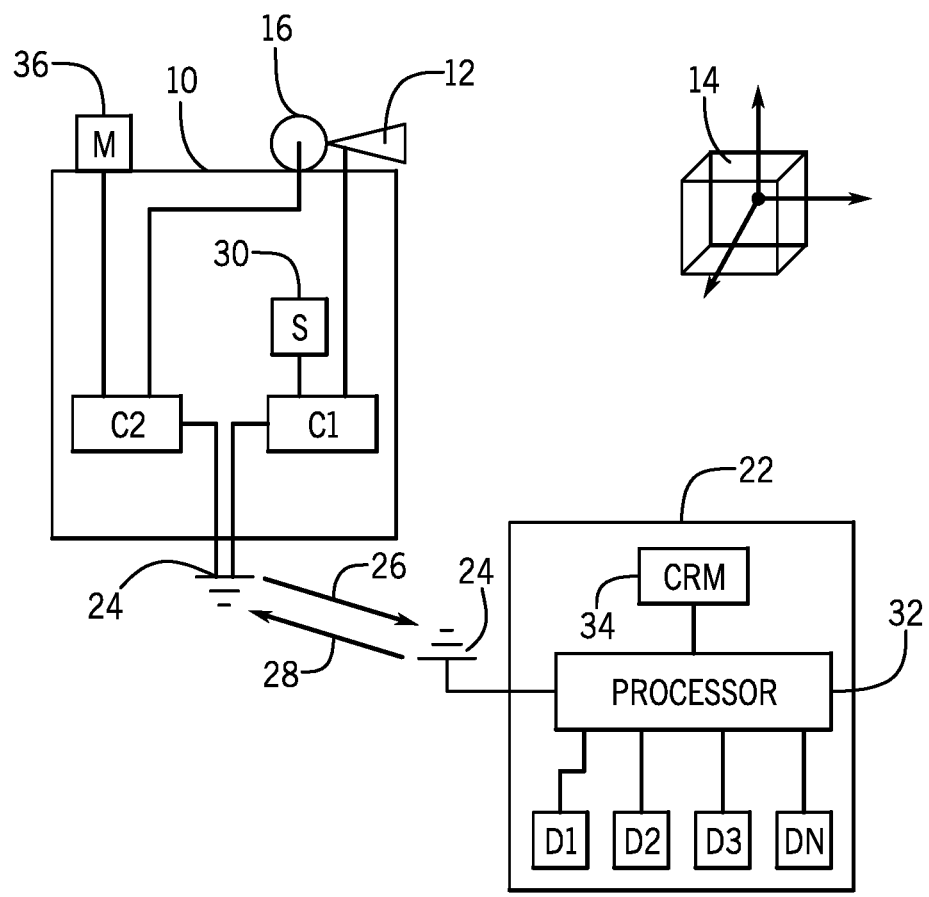
FIG. 5 is a system diagram of an exemplary embodiment of a system for robotic tracking navigation with data fusion.

FIG. 5 depicts an additional exemplary embodiment of a system for robotic tracking navigation with data fusion. The system of FIG. 5 provides an alternative embodiment, wherein the computational processing is divided between the drone 10 and a control work station 22. In this embodiment, the computational processing is divided between the drone 10 and the control work station 22. The two are communicatively connected, exemplarily with wireless antennas 24 whereby as described in further detail herein, the drone 10 provides the sensor data 26 to the control work station and the control work station 22 provides the position control commands 28 back to the drone 10.

The drone 10 exemplarily includes a camera 12 as previously described and the drone 10 may further include one or more additional sensors 30 as previously described. A first control or sensor controller C1 receives the sensor data from the camera 12 and/or the additional sensors 30 and processes the sensor data in a manner such that it may be communicated to the control work station 22, for example through wireless communication between antennas 24. It will also be recognized that the communication between drone 10 and the control work station 22 may be achieved through other communicative platforms or technologies, including, but not limited to wired and wireless communication connection as well as optical or other forms of wireless communication.

The processor 32 of the control work station 22 may exemplarily operate in a similar manner as the controller 18 described above with respect to FIG. 2. The processor 32 may exemplarily be a Intel Core i7 processor which is communicatively connected to a computer readable medium 34 upon which computer readable code is stored, the processor 32 receives the sensor data 26 and executes the computer readable code from the CRM 34 to process the sensor data 26 according to a plurality of detector modules D1-Dn and to produce position commands based upon the outputs of the plurality of detector modules which are combined in the HAB-DF manner as described in the present application. By applying the HAB-DF process to produce position commands based upon a fusion of a majority voting representation and a Mahalanobis distance from the outputs of the detector modules. The control work station 22 returns the position control commands back to the drone 10 whereupon the position control commands 28 are provided to the position controller C2 of the drone 10. The position controller C2 may exemplarily be embodied in a plurality of controllers, each controller configured to provide position commands to the position motors 36 of the drone or a camera motor 16 operable to adjust a position/orientation of the camera 12. The position controller C2 may exemplarily be a PID controller or a PD controller and may operate to convert the position control commands 28 into PWM signals provided to the servo motor 16, 36. Such an embodiment as depicted in FIG. 5 may be advantageously used in an embodiment wherein communication between the drone 10 control workstation 22 can be reliably provided and due to size, processing, power, or other constraints, it is desirable to physically separate the computation functions from the drone 10.

Figure 6:
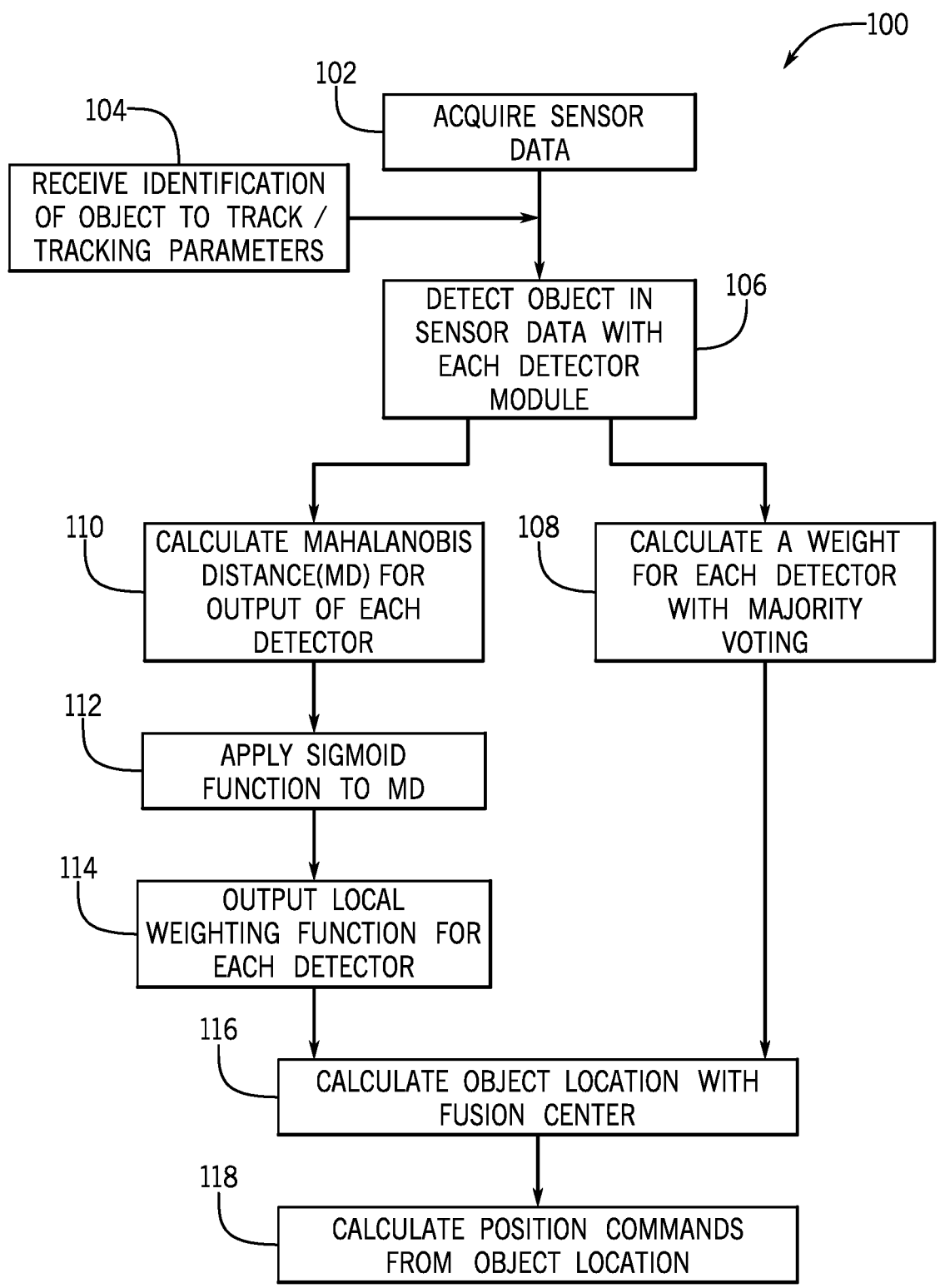
FIG. 6 is a flow chart of an exemplary embodiment of a method of robotic tracking navigation with data fusion.

FIG. 6 is a flow chart that depicts an exemplarily embodiment of a method of robotic tracking navigation with data fusion. In the method 100, sensor data is acquired at 102. The sensor data acquired at 102 is exemplarily image data, although as previously described, may be any of a variety of any other forms of sensor data. At 104 an identification of the object to track and/or tracking parameters is received. Exemplarily, this information provides an initial identification of the object to be tracked and a definition thereof. Such identification may include a model or example of the object to be tracked, and identification or identifying features of the object to be tracked and/or features or object identification techniques or algorithms to be used.

At 106, the object is detected in the sensor data with each of a plurality of detector modules. As previously described, the method employs multiple detector modules, the outputs of which are fused in the manner described. Each detector module represents a specific detection algorithm or technique and it is recognized that one or more detector modules may be applied to the same sensor data such that an embodiment of the method 100 may employ more detector modules than there are individual sources of sensor data. In one exemplary and non-limiting embodiment, the detector module used any be DSSTtld, CMT, and Struck bounding box detector.

With the outputs of the detector modules, the method 100 employs two techniques for fusing the detector output. At 108 a majority voting technique is used wherein the Euclidian distances between the detector module outputs are determined and the outlier detectors penalized in a weighting to calculate a statistical minimum value consensus between all of the detector module output. In an exemplary embodiment, the weighting penalty is calculated using a hyperbolic tangent which allows a soft transition between penalties applied to the outputs of each of the detector modules.

At 110, Kalman filters, like other filters, can be susceptible to large estimation errors or not robust to outliers. Therefore, in a second technique, each of the detector modules are treated as a local expert and a Mahalanobis distance (MD) is calculated for the output of each detector. The MD provides a measure of the deviation of an output value from its expected distribution. This can help to identify outliers so that they can be weighted accordingly. A sigmoid function is applied at 112 to the calculated MDs for each of the detector module outputs. The sigmoid function provides a soft transition to the weighting of the outputs of an individual detector module based upon the MD rather than defining a hard threshold for weighting penalty.

Based upon the MD and the sigmoid function, a local weighting function is output for each of the detector modules which represent that detector module's performance relative to outliers. At 116, the object location is calculated with a fusion center arranged as a common filter which receives the detector module outputs weighted in the manners described above and to update this location at each measurement received from the sensor data as processed by each of the detector modules.

At 118, the output of the fusion center is used to calculate position commands from the calculated object location. This is exemplarily done with state space equation model of the system which translates the observations of the outputs of the detector modules into position control commands to be carried out by the motor controllers as described above.

In additional embodiments autoencoders can be used to analyze the MD's calculated in the system to detect various failure cases as they occur and therefore to further weight against such failures when a potential case is detected. In particular when one or more of the detectors is lost for any significant amount of time, the MD may not report this as a failure due to the drift of the Kalman filter. Therefore, an additional process for outlier detection of anomalous data can improve performance by providing a further determination of detector loss. Once the failed or failing detector is identified, it can be weighted less in the rest of the system. In this approach, a Jaccard Index is computed as:

$$J(b_t) = \frac{|b_t \cap b_g|}{|b_t \cup b_g|} \quad \text{Eq. 23}$$

where bg is the groundtruth. The acquired data is divided into multiple datasets. When all detectors at a frame have a Jaccard Index greater than ti this is attributed as "normal" data:

$$F_S = \{f_m \in F | J(b_m^{(n)}) < \tau\} \quad \text{Eq. 24}$$

When all detectors at a frame have a Jaccard Index less than τ, this is attributed s "globally anomalous" data:

$$F_G = \{f_m \in F | J(b_m^{(n)}) < \tau\} \quad \text{Eq. 25}$$

When all trackers except for one at a frame have a Jaccard Index greater than τ, this is attributed as "locally anomalous" data for the specific tracker that is less than the Jaccard Index. This creates N different datasets, with one for each tracker:

$$F_O^{(k)} = \{f_m \in F | J(b_m^{(k)}) < \tau\} \wedge J(b_m^{(n)}) > \tau \quad \text{Eq. 26}$$

A deep neural network, for example an autoencoder is trained with acquired data to learn to model the behavior of the detectors under normal operation. When the data received from the detectors is significantly different than the modeled normal operation, autoencoder will not perform as well and this change in a calculated reconstruction error of the autoencoder can be used to identify anomalous data by comparing to a threshold, e.g. the Jaccard Index.

A Hierarchical Adaptive Bayesian Data Fusion method is disclosed. While not limited to specific applications, one exemplary embodiment used herein is vision-based robotic control, although persons of ordinary skill in the art will recognize other applications and uses while remaining within the scope of the present disclosure. Exemplary experimental embodiments were found to outperform single detectors, with better accuracy and keeping track for longer periods of time. Moreover, exemplary embodiments used no training data while most approaches in this field rely on machine learning techniques. Machine learning techniques require large amounts of training data to achieve good performance. Even when substantial amounts of training data are available, these methods may be unable to handle situations that were not properly explored during training. The HAB-DF relies instead on the local statistical performance of the individual data sources. In addition, the decentralized architecture allows the experts to operate asynchronously, while penalizing measurements that are delivered to the fusion center with significant delays. Finally, the weighted majority voting scheme allows sensors that provide measurements which are discrepant or have low confidence to be automatically discarded from the estimation.

It will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A navigable robot comprising:
   at least one sensor configured to produce tracking data of a target object, wherein the at least one sensor comprises a camera and the tracking data comprises at least image data;
   a plurality of detector modules, each detector module in the plurality comprising at least one processing algorithm to independently provide a local estimate of a location of the target object when applied to the tracking data;

a controller connected to the at least one sensor and the plurality of detector modules, the controller receives tracking data acquired by the at least one sensor, the controller calculates a Mahalanobis distance (MD) between an estimated value and the local estimate for each of the local estimates, wherein the MD is a first weighting factor for each of the local estimates, calculates a Euclidean distance between each of the local estimates, and calculates a second weighting factor for each of the local estimates based upon the calculated Euclidean distance, and the controller combines the local estimates in an adaptive Bayesian fusion based upon each of the local estimates weighted by the respective first weighting factor and the second weighting factor for each of the local estimates to produce a target location; and at least one navigation motor and the controller produces at least one control command based upon the target location and provides the at least one control command to the navigation motor, and in response to the at least one control command, the navigation motor operates to move the navigable robot relative to the target location;

wherein the controller uses an autoencoder trained with acquired data to learn a model of the detector modules of the plurality of detector modules under normal operation and analyzes local estimates from each detector module of the plurality of detector modules to determine an event of detector failure and decreases a weighting of a local estimate from a detector module based upon the determined event of detector failure.

2. The navigable robot of claim 1, wherein the controller calculates the MD for each of the local estimates with at least one first Kalman filter and further combines the local estimates weighted by the respective first weighting factor and the second weighting factor for each of the local estimates with at least one second Kalman filter.

3. The navigable robot of claim 1, comprising a plurality of sensors including the at least one sensor and wherein the plurality of sensors comprise at least one non-camera sensor.

4. The navigable robot of claim 3, wherein the non-camera sensor comprises a range sensor, depth sensor, radar, or GPS.

5. The navigable robot of any of claim 1, wherein the navigable robot is a pan-tilt robot, an unmanned aerial vehicle (UAV), or a mobile ground based robot.

6. The navigable robot of claim 1, wherein the controller applies a Jaccard Index to the outputs of each detector module of the plurality of detector modules to segment the data into datasets for analysis with the autoencoder.

7. A method of robotic navigation of a navigable robot, wherein the navigable robot comprises:

at least one sensor configured to produce tracking data of a target object;

a plurality of detector modules, each detector module in the plurality comprising at least one processing algorithm to independently provide a local estimate of a location of the target object when applied to the tracking data;

a controller connected to the at least one sensor and the plurality of detector modules, the controller receives tracking data acquired by the at least one sensor and applies the algorithms from the plurality of detector modules to the tracking data to produce a plurality of separate estimates of the location of the target object in the tracking data, the controller weights the separate estimates and combines the local estimates in an adaptive Bayesian fusion based upon the weighted local estimates to produce a target location; and at least one navigation motor and the controller produces at least one control command based upon the target location and provides the at least one control command to the navigation motor to move the navigable robot relative to the target location; and the method of robotic navigation comprises:

obtaining tracking data from the at least one sensor;

separately estimating with the plurality of detector modules local estimates of a target location from the tracking data from the at least one sensor;

calculating a Mahalanobis distance between an estimated value and the local estimate for each of the local estimates, wherein the Mahalanobis distance is a first weighting factor for each of the local estimates;

applying a sigmoid function to the MD for the output of each detector module before producing the first weighting factor for each of the local estimates calculating a Euclidean distance between each of the local estimates, and calculating a second weighting factor for each of the local estimates based upon the calculated Euclidean distance; and combining the local estimates in an adaptive Bayesian fusion based upon each of the local estimates weighted by the respective first weighting factor and the second weighting factor for each of the local estimates to produce the target location.

8. The method of claim 7, further comprising providing an instruction to the navigable robot to move relative to the target location.

9. The method of claim 8 wherein the tracking data is obtained from a plurality of sensors comprising at least one camera, the plurality of sensors comprising the at least one sensor.

10. The device of claim 9, wherein the plurality of sensors comprises a plurality of cameras.

11. The method of claim 9, wherein the plurality of detector modules comprises a plurality of visual tracking algorithms applied to image data from the at least one camera.

12. The method of claim 11, wherein the plurality of image recognition algorithms comprise one or more of TLD, CMT, STRUCK, and GOTURN.

13. The method of claim 12, wherein the local estimates of the target location are each estimated using a Kalman Filter.

14. The method of claim 7, further comprising generating robotic control commands from the target location.

* * * * *